(12) United States Patent  (10) Patent No.: US 7,227,595 B2
Kita  (45) Date of Patent: Jun. 5, 2007

(54) LIQUID CRYSTAL TELEVISION RECEIVER

(75) Inventor: Tatsuya Kita, Osaka (JP)

(73) Assignee: Funai electric Co., Ltd., Daito-shi (JP)

( * ) Notice: Subject to any disclaimer, the term of this patent is extended or adjusted under 35 U.S.C. 154(b) by 497 days.

(21) Appl. No.: 10/913,670

(22) Filed: Aug. 5, 2004

(65) Prior Publication Data

US 2005/0030436 A1    Feb. 10, 2005

(30) Foreign Application Priority Data

Aug. 8, 2003  (JP)  ............ P. 2003-206675

(51) Int. Cl.
*H04N 3/14* (2006.01)
*H04N 5/63* (2006.01)

(52) U.S. Cl. ............... 348/790; 348/730; 348/733

(58) Field of Classification Search ........ 348/790–793, 348/730–733, 725, 553; 345/99, 100, 87
See application file for complete search history.

(56) References Cited

U.S. PATENT DOCUMENTS

| 4,581,654 A | * | 4/1986 | Kobayashi et al. | ......... 348/790 |
| 4,969,046 A | * | 11/1990 | Sugimoto et al. | ........... 348/839 |

FOREIGN PATENT DOCUMENTS

| JP | 62-10976 | 1/1987 |
| JP | 6-188687 | 7/1994 |
| JP | 6-319087 | 11/1994 |
| JP | 7-222076 | 8/1995 |
| JP | 8-5986 | 1/1996 |
| JP | 9-51633 | 2/1997 |
| JP | 9-214843 | 8/1997 |
| JP | 9-261045 | 10/1997 |
| JP | 10-161080 | 6/1998 |
| JP | 2000-28987 | 1/2000 |
| JP | 2000-231090 | 8/2000 |
| JP | 2002-258244 | 9/2002 |

OTHER PUBLICATIONS

Japanese Office Action for Japanese patent application No. 2003-206675, mailed Sep. 22, 2006, and English translation thereof, 5 pages.

\* cited by examiner

*Primary Examiner*—Michael H. Lee
(74) *Attorney, Agent, or Firm*—Osha Liang LLP

(57) ABSTRACT

A liquid crystal television receiver includes a DC power supply to generate and output tuning DC power, a receiving portion, a display portion, and a series regulator. Preferably, the receiving portion is fed the tuning DC power and receives a video signal, the display portion includes an active-matrix liquid crystal panel, a gate driver to generate a gate-on signal and drive a gate line and a data driver to drive a data line, allowable ranges of voltage of the tuning DC power and the gate-on DC power share a common range in which a voltage of the tuning DC power is set, the tuning DC power is fed to the gate driver, and the series regulator is provided on at least one of power supply paths to feed the tuning DC power from the DC power supply to the gate driver and to the receiving portion, and removes noise component.

3 Claims, 3 Drawing Sheets

LIQUID CRYSTAL TELEVISION RECEIVER

BACKGROUND OF THE INVENTION

1. Field of the Invention

The present invention relates to a liquid crystal television receiver having a receiving portion, which uses a variable-capacitance diode as an element of a receiving tuning circuit, and a display portion using a liquid crystal panel as a display device.

2. Description of the Related Art

As shown in FIG. 3, in a television receiver (hereunder referred to as first related art) employing a liquid crystal panel as a display device, a display portion 91 for displaying video signals outputted from a receiving portion 2 is provided with a gate driver 11 for driving gate lines of the liquid crystal panel 12, and with a data driver 14 for driving data lines thereof. Further, the display portion 91 is also provided with a DC power supply portion 3 for generating and outputting 3.3 V DC power 21 needed by the receiving portion 2. Moreover, the DC power supply portion 3 generates and outputs 3.3 V tuning DC power 22 required to generate tuning signals applied to a variable-capacitance diode 18 of a tuning circuit 17 of a tuner 16 provided in the receiving portion 2. On the other hand, in a display portion 91, a DC-DC converter 15 using the 3.3 V DC power 21 as operating power thereof is provided and generates 12 V DC power needed by the data driver 14. Also, a charge pump 92 employing 12 V DC power 23 as operating power thereof is provided therein and generates 33 V gate-on DC power, which is needed by the gate driver 11 for generating gate-on signals.

Furthermore, the following related art (hereunder referred to as second related art) has been proposed. That is, in this related art, a tuner unit (22a) is configured in such a way as to be able to be attached to various kinds of liquid crystal display units (21). Further, the tuner unit (22a) is provided with a power supply portion (90) for generating power needed by the liquid crystal display unit (21). Furthermore, this related art is adapted so that "a liquid crystal display kind signal (MS) from a liquid crystal display kind signal generating portion (64) is outputted to the power supply portion (90) of a tuner unit (22a), and drive power associated with the kind of a liquid crystal display portion (60) is supplied to the liquid crystal display portion (60)" (see for example, JP-A-8-5986 (Paragraph No. [0056], and FIGS. 1 to 3)).

SUMMARY OF THE INVENTION

However, an electric power supply has a slight instability in some regions, where a stabilizing mechanism is necessary for a television receiver. The stabilizing mechanism can be implemented by a series regulator. Although, in order to reduce a cost a television receiver in other area can dispense with the stabilizing mechanism, television receivers in market include the stabilizing mechanism for safety.

The use of the first related art causes the following problems. That is, although a charge pump 92 is used for generating gate-on DC power 93, which is needed by the gate driver 11, this charge pump 92 is a circuit requiring plural capacitors and plural diodes, so that the size of the circuit is relative large. This has resulted in increase in the number of components and in rise in the cost of the components.

Further, the second related art is techniques of generating drive power associated with the kind of the liquid crystal display unit, to which the tuner unit is attached, in the tuner unit and supplying the generated power to the liquid crystal display portion. Thus, from the viewpoint of resolving the problems of the first related art, the second related art is difficult to apply.

The invention is created to solve the problems. An object of the invention is to provide a liquid crystal television receiver enabled to prevent increase in the number of components thereof and decrease in receiver sensitivity due to the sneaking of noises, which occurs when the gate driver drives the gate lines, by supplying tuning DC power, which is to be supplied to a receiving portion for performing an analog operation, also to a gate driver, which performs a digital operation, as gate-on DC power, to thereby eliminate the use of a charge pump for generating gate-on DC power in a configuration thereof, in which there is a common range between an allowable range of voltages corresponding to the tuning DC power and an allowable range of voltages corresponding to the gate-on DC power.

Further, an object of the invention is to provide a liquid crystal television receiver enabled to prevent increase in the number of components thereof by supplying tuning DC power, which is to be supplied to a receiving portion for performing an analog operation, also to a gate driver, which performs a digital operation, as gate-on DC power to thereby eliminate the use of a charge pump for generating gate-on DC power in a configuration thereof, in which there is a common range between an allowable range of voltages corresponding to the tuning DC power and an allowable range of voltages corresponding to the gate-on DC power.

To solve the foregoing problems, according to an aspect of the invention, there is provided a liquid crystal television receiver including a DC power supply to generate and to output tuning DC power providing a predetermined voltage, a receiving portion to output a video signal, a display portion to display the video signal, and a lowpass filter. Preferably, the receiving portion is fed the tuning DC power, sets a tuning frequency of a tuning circuit at a frequency corresponding to a received channel by applying a tuning signal to a variable-capacitance diode included in the tuning circuit, and receives a video signal, the tuning signal being generated according to the tuning DC power, the display portion includes an active-matrix liquid crystal panel, a gate driver to generate a gate-on signal and to drive a gate line of the active-matrix liquid display panel using the gate-on signal which turns on a gate by using gate-on DC power as operating power, and a data driver to drive a data line of the active-matrix liquid crystal panel, an allowable range of voltage corresponding to the tuning DC power and an allowable range of voltage corresponding to the gate-on DC power share, at least partly, a common allowable range of voltage, the tuning DC power is fed to the gate driver as the gate-on DC power, the lowpass filter is provided on at least one of a first power supply path to feed the tuning DC power from the DC power supply to the gate driver and a second power supply path to feed the tuning DC power from the DC power supply to the receiving portion and removes noise component which is generated when the gate driver drives the gate lines, and a voltage corresponding to the tuning DC power is set to be within the common allowable range of voltage.

That is, the gate driver is operated by the tuning DC power supplied as a substitute for the gate-on DC power. A noise component, which sneaks through a path of the tuning DC power into the receiving portion, is removed by the lowpass filer, so that the noise component is not transmitted to the receiving portion.

According to another aspect of the invention, there is provided a liquid crystal television receiver including a DC power supply to generate and to output tuning DC power providing a predetermined voltage, a receiving portion to output a video signal, a display portion to display the video signal, and a series regulator. Preferably, the receiving portion is fed the tuning DC power, sets a tuning frequency of a tuning circuit at a frequency corresponding to a received channel by applying a tuning signal to a variable-capacitance diode included in the tuning circuit, and receives a video signal, the tuning signal being generated according to the tuning DC power, the display portion includes an active-matrix liquid crystal panel, a gate driver to generate a gate-on signal and to drive a gate line of the active-matrix liquid display panel using the gate-on signal, which turns on a gate by using gate-on DC power as operating power, and a data driver to drive a data line of the active-matrix liquid crystal panel, an allowable range of voltage corresponding to the tuning DC power and an allowable range of voltage corresponding to the gate-on DC power share, at least partly, a common allowable range of voltage, the tuning DC power is fed to the gate driver as the gate-on DC power, the series regulator is provided on at least one of a first power supply path to feed the tuning DC power from the DC power supply to the gate driver and a second power supply path to feed the tuning DC power from the DC power supply to the receiving portion, removes noise component, which is generated when the gate driver drives the gate lines, and stabilize a voltage applied to the gate driver, and a voltage corresponding to the tuning DC power is set to be within the common allowable range of voltage.

That is, the gate driver is operated by the tuning DC power supplied as a substitute for the gate-on DC power. A voltage applied to the gate driver, which is different from the tuning DC power voltage, is controlled to be stabilized, as well as a noise component, which sneaks through a path of the tuning DC power into the receiving portion, is removed by the series regulator, so that the noise component is not transmitted to the receiving portion.

Further, according to yet another aspect of the invention, there is provided a liquid crystal television receiver including a DC power supply to generate and to output tuning DC power providing a predetermined voltage, a receiving portion to output a video signal, and a display portion to display the video signal. Preferably, the receiving portion is fed the tuning DC power, sets a tuning frequency of a tuning circuit at a frequency corresponding to a received channel by applying a tuning signal to a variable-capacitance diode included in the tuning circuit, and receives a video signal, the tuning signal being generated according to the tuning DC power, the display portion includes an active-matrix liquid crystal panel, a gate driver to generate a gate-on signal and to drive a gate line of the active-matrix liquid display panel using the gate-on signal which turns on a gate by using gate-on DC power as operating power, and a data driver to drive a data line of the active-matrix liquid crystal panel, an allowable range of voltage corresponding to the tuning DC power and an allowable range of voltage corresponding to the gate-on DC power share, at least partly, a common allowable range of voltage, the tuning DC power is fed to the gate driver as the gate-on DC power, and a voltage corresponding to the tuning DC power is set to be within the common allowable range of voltage.

That is, the gate driver is operated by the tuning DC power supplied as a substitute for the gate-on DC power. The constitution of directly connecting the DC power supply with the gate driver reduces a cost.

BRIEF DESCRIPTION OF THE DRAWINGS

Preferred embodiments of the present invention will be described in detail based on the following figures, wherein.

DETAILED DESCRIPTION OF THE INVENTION

Hereinafter, an embodiment of the invention is described by referring to the accompanying drawings.

Figure 1:
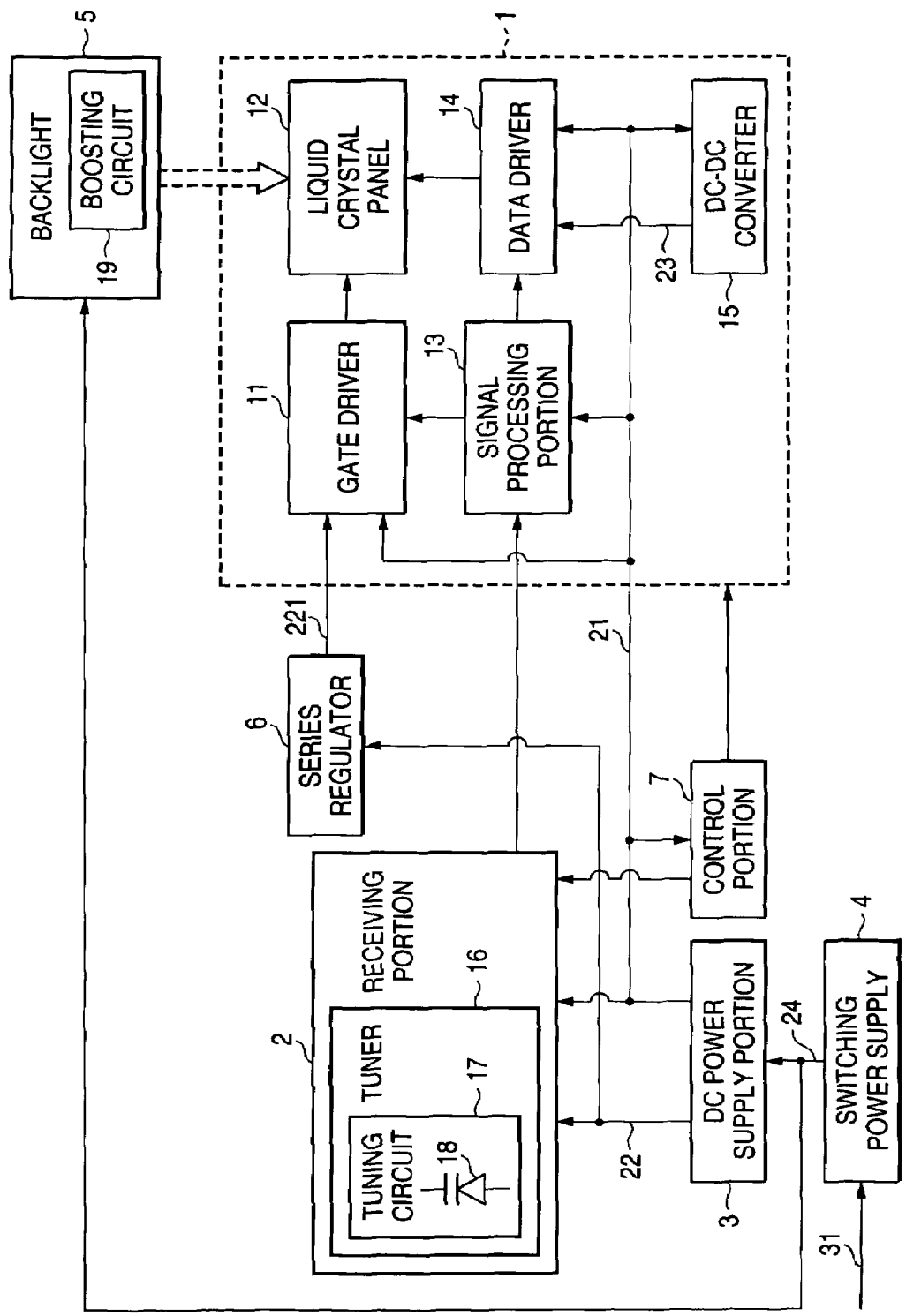
FIG. 1 is a block diagram showing the electrical configuration of an embodiment of a liquid crystal television receiver.
Figure 3:
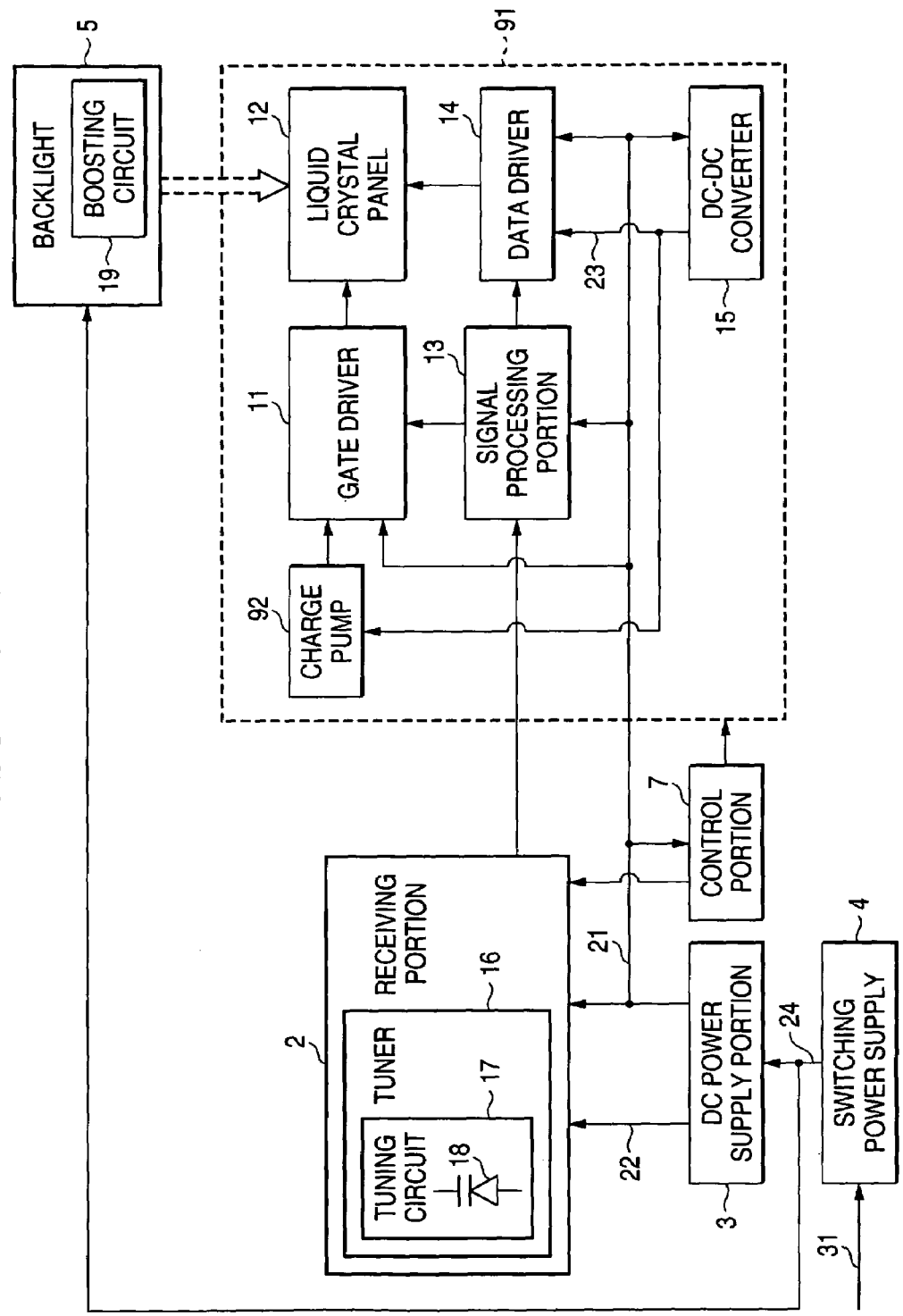
FIG. 3 is a block diagram showing the electrical configuration of the related art.

FIG. 1 is block diagram showing the electrical configuration of an embodiment of a liquid crystal television receiver according to the invention. In this figure, a block, whose configuration is the same as that of a component of the related art shown in FIG. 3, is designated by reference character, which is the same as that denoting the component of the related art in FIG. 3.

As illustrated in FIG. 1, a switching power supply 4 generates 12 V DC power from a commercial power source 31. Then, the switching power supply 4 sends the generated 12 V DC power 24 to the DC power supply 3 and the backlight 5. The DC power supply 3 generates 3.3 V DC power 21 from the 12 V DC power 24. Also, the DC power supply 3 generates 33 V DC power 22 serving as analog power (tuning DC power) used for permitting a tuner 16 of the receiving portion 2 to use the tuning frequency of a tuning circuit 17 as a target frequency. Then, the DC power supply 3 sends the generated DC power 22 to the receiving portion 2. Additionally, the DC power supply 3 sends the tuning DC power 22, which is analog power, to the gate driver 11, which performs a digital operation, through the series regulator 6 as 33 V gate-on DC power. That is, the 33 V DC power supply 22 is used as a power source for the receiving portion 2, which is an analog circuit, and also used as a power source for the gate drier 11 that is a circuit block provided in a display portion 1, which is independent of the receiving portion 2, and that performs a digital operation.

The receiving portion 2 receives a commercial broadcast on a channel designated by a controller 7, and sends video signals, which are obtained by being received, to a signal processor 13 of the display portion. Thus, the receiving portion 2 has a tuner 16. Further, the tuner 16 sets the tuning frequency of the tuning circuit 17 at a frequency associated to the received channel by applying a tuning signal, which is generated according to the 33 V tuning DC power 22, to a variable-capacitance diode 18, which is an element of the tuning circuit 17. Incidentally, the allowable range of voltages corresponding to the tuning DC power supply 22 of the receiving portion 2 is a neighborhood range of 33 V.

The display portion 1 displays video signals, which are sent from the receiving portion 2, on a liquid crystal panel 12. Thus, the display portion 1 has the gate driver 11, the signal processor 13, and the data driver (source driver) 14, and a DC-DC converter 15. The signal processor 13 is a block using 3.3 V DC power 21 as operating power. Further, the signal processor 13 generates a signal, which represents scanning timing, from the video signals sent from the receiving portion 2 and sends the generated signal to the gate driver 11. Also, the signal processor 13 generates signals, which respectively represent the luminances of primary colors, from the video signals and sends the generated signals to the data driver 14. The DC-DC converter 15 generates 12 V DC power 23 (the voltage corresponding to which may have another value (for example, 9 V or 10 V) from the 3.3 V DC power 21 and sends the generated power to the data driver 14.

The gate driver 11 is a block using 33 V gate-on DC power 221, which is sent from the series regulator 6, and the 3.3 V DC power 21 as operating power (the value of current corresponding to the gate-on DC power 221 is 10 mA at a maximum, and usually several mA). Further, the gate driver 11 generates a gate-on signal according to a signal representing timing, which is sent from the signal processor 13, by using the 33 V gate-on DC power. Furthermore, the gate lines of the liquid crystal panel 12 are driven by the generated gate-on signals. Incidentally, in the gate driver 11, the allowable range of voltages corresponding to the gate-on DC power 221 is the neighborhood range of 33 V.

The data driver 14 is a block using 12 V DC power 23, which is sent from the DC-DC converter 15, and the 3.3 V DC power as operating power. Further, the data driver 14 generates data signals representing luminances according to signals that are sent from the signal processor 13 and that represent the luminances of primary colors. Also, the data driver 14 drive data lines (source lines) of the liquid crystal panel 12 according to the generated data signals.

The backlight 5 has a cold cathode tube serving as a light source, and a light guide plate for changing light, which is generated by the cold cathode tube, to surface-like light. Also, the backlight 5 has a boosting circuit 19 for generating a high voltage needed by the cold cathode tube.

The control portion 7 mainly comprises a microcomputer, which is operated by the 3.3 V DC power 21, and controls a primary operation of the television receiver. Thus, the control portion 7 controls a channel received by the receiving portion 2. Also, the control portion 7 controls display in the display portion 1. That is, the control portion 7 controls the brightness, the contrast, and the hue of an image displayed on the liquid crystal panel 12.

Figure 2:
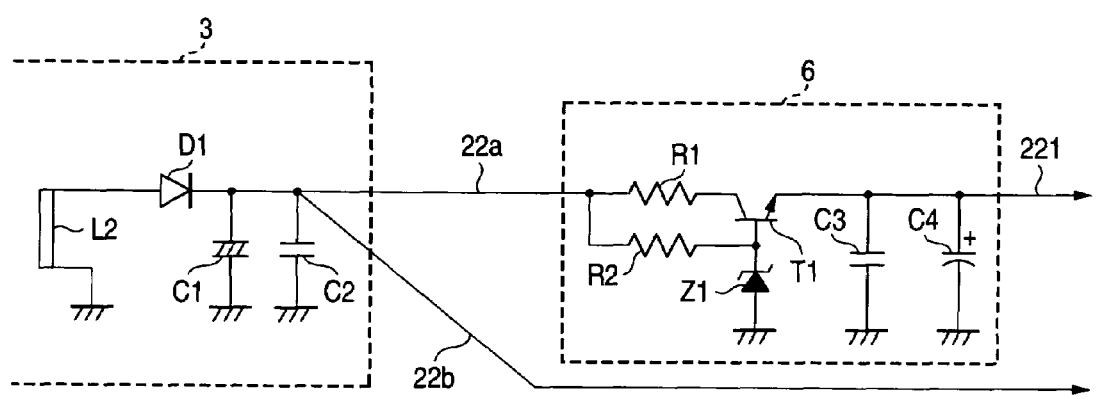
FIG. 2 is a circuit diagram showing the electrical connection between a connection path of a tuning DC power supply and a series regulator.

The series regulator 6 serves as a filter for preventing reduction in the receiver sensitivity in the receiving portion 2 from being caused by the sneaking of noise components, which are generated when the gate driver 11 drives gate lines, toward the receiving portion 2. Thus, as illustrated in FIG. 2, the series regulator 6 has a capacitor C4. Incidentally, the capacitor C4 is connected to a terminal of the transistor T1, which is provided at the side of the gate driver 11, and to the ground level.

A voltage of the tuning DC power is slightly different from the voltage of the gate driver, i.e. the voltage of the gate driver is lower. The object of the circuit in FIG. 2 is to adjust a voltage to the voltage of the tuning DC power to the voltage of the gate driver.

On the other hand, in the DC power supply 3, an output of a secondary coil is rectified and smoothed by using a rectifying/smoothing circuit consisting of a diode D1 and a capacitor C1. Thus, the 33 V DC power 22 is generated. Also, a capacitor C2 is connected between a position in the vicinity of an output point of the DC power supply 22 and the ground level so as to remove high-frequency components (noise components generated when the gate driver 11 drives gate lines) Furthermore, a printed wiring pattern is formed so that the path 22a of the tuning DC power to be sent to the series regulator 6 and the path 22b of the turning DC power to be sent to the receiving portion 2 branch out in the vicinity of the position of a terminal of the capacitor C2.

Thus, in the case where the gate driver 11 is viewed from the side of the receiving portion 2 through the path of the 33 V power, the gate driver 11 is connected thereto through a series regulator consisting of the resistors R1, R2, transistor T1, zener diode Z1, and capacitors C3 and C4. Thus, the noise components, which are generated from the gate driver 11 and sneak into the receiving portion 2, are effectively removed, and the voltage is stabilized.

An operation of the embodiment of the aforementioned configuration is described hereinbelow.

The receiving portion 2 is supplied with the tuning DC power 22 corresponding to a voltage in the allowable range. Thus, the tuner 16 generates a tuning signal according to the tuning DC power 22 and applies the generated signal to the variable-capacitance diode 18 that is a constituent element of the tuning circuit 17. Therefore, the tuning frequency of the tuning circuit 17 is set at a frequency associated with the received channel. Consequently, video signals in the received channel are sent to the display portion 1.

On the other hand, the gate driver 11 of the display portion 1 is supplied with the gate-on DC power (or the tuning DC power) 221 corresponding to a voltage in the allowable range. Thus, the gate driver 11 generates the gate-on signals by using the gate-on DC power 221, and drives the gate lines of the liquid crystal panel 12. Further, the data driver 14 drives the data lines of the liquid crystal panel 12. Consequently, in the liquid crystal panel 12, video signals in the received channel are displayed.

During the aforementioned operation is performed, the noise components caused due to the driving of the gate lines by the gate driver 11 leak to the path 221 for the gate-on DC power. However, regarding the path of the 33V DC power, the gate driver 11 and the receiving portion 2 are separated from each other by the π-type filter consisting of the capacitor C2 and the series regulator 6, which are provided in the DC power supply 3. Thus, the noise components leaking out to the path 221 are removed at a high rate, and do not intrude into the receiving portion 2. The voltage of the gate driver is stabilized. Consequently, the receiving portion 2 can receive a commercial broadcast without reducing the sensitivity thereof.

Incidentally, the invention is not limited to the aforementioned embodiment. In the case that there is a common range between the allowable range of voltages corresponding to the tuning DC power and the allowable range of voltages corresponding to the gate-on DC power, the invention can similarly be applied to a case where the voltage corresponding to the tuning DC power and the voltage corresponding to the gate-on DC power are other voltages.

Additionally, although it has been described that the series regulator 6 is provided on the path 22a from the DC power supply 3 to the gate driver 11, the receiver may be configured so that the series regulator 6 is provided on the path 22b from the DC supply 3 to the receiving portion 2.

Moreover, a lowpass filter can be provided in place of the series regulator 6, in order to remove the noise component and to reduce a cost.

As described above, according to the invention, the tuning DC power outputted by the DC power supply is fed to the gate driver as the gate-on DC power. Additionally, the voltage corresponding to the tuning DC power is set to be within a range of volts allowed by both the receiving portion and the gate driver. Further, the lowpass filter for removing noise components generated by driving the gate lines by the gate driver is provided on at least one of the power path for feeding the tuning DC power to the gate driver, and the power path for feeding the tuning DC power from the DC power supply to the receiving portion. Therefore, the gate driver is operated by the tuning DC power supplied instead of the gate-on DC power. Further, the noise components, which are generated at the gate driver and would intrude into the receiving portion through the path for the tuning DC power, are removed by the lowpass filter, so that the noise components are not transmitted to the receiving portion. Thus, the charge pump is unnecessary. Consequently, increase in the number of parts can be prevented. Also, decrease in the receiver sensitivity due to the sneaking of noises, which occurs when the gate driver drives the gate lines, can be prevented.

According to the invention, the tuning DC power outputted by the DC power supply is fed to the gate driver as the gate-on DC power. Additionally, the voltage corresponding to the tuning DC power is set to be within a range of volts allowed by both the receiving portion and the gate driver. Further, the series regulator for removing noise components generated by driving the gate lines by the gate driver and for stabilizing the voltage applied to the gate driver is provided on at least one of the power path for feeding the tuning DC power to the gate driver, and the power path for feeding the tuning DC power from the DC power supply to the receiving portion. Therefore, the gate driver is operated by the tuning DC power supplied instead of the gate-on DC power. Further, the noise components, which are generated at the gate driver and would intrude into the receiving portion through the path for the tuning DC power, are removed by the series regulator, so that the noise components are not transmitted to the receiving portion. Moreover, the voltage applied from the DC power supply to the gate driver is stabilized. Thus, the charge pump is unnecessary. Consequently, increase in the number of parts can be prevented. Also, decrease in the receiver sensitivity due to the sneaking of noises, which occurs when the gate driver drives the gate lines, can be prevented.

According to the invention, the tuning DC power outputted by the DC power supply is fed to the gate driver as the gate-on DC power. Moreover, the voltage corresponding to the tuning DC power is set to be within a range of volts allowed by both the receiving portion and the gate driver. Thus, the gate driver is operated by the tuning DC power supplied instead of the gate-on DC power. Consequently, increase in the number of components can be prevented, and the cost is reduced.

What is claimed is:

1. A liquid crystal television receiver comprising:
   a DC power supply to generate and to output tuning DC power providing a predetermined voltage;
   a receiving portion to output a video signal;
   a display portion to display the video signal; and
   a series regulator,
   wherein
   the receiving portion is fed the tuning DC power, sets a tuning frequency of a tuning circuit at a frequency corresponding to a received channel by applying a tuning signal to a variable-capacitance diode included in the tuning circuit, and receives a video signal, the tuning signal being generated according to the tuning DC power,
   the display portion includes:
   an active-matrix liquid crystal panel;
   a gate driver to generate a gate-on signal and to drive a gate line of the active-matrix liquid display panel using the gate-on signal, which turns on a gate by using gate-on DC power as operating power; and
   a data driver to drive a data line of the active-matrix liquid crystal panel,
   an allowable range of voltage corresponding to the tuning DC power and an allowable range of voltage corresponding to the gate-on DC power share, at least partly, a common allowable range of voltage,
   the tuning DC power is fed to the gate driver as the gate-on DC power,
   the series regulator is provided on at least one of a first power supply path to feed the tuning DC power from the DC power supply to the gate driver and a second power supply path to feed the tuning DC power from the DC power supply to the receiving portion, removes noise component, which is generated when the gate driver drives the gate lines, and stabilize a voltage applied to the gate driver, and
   a voltage corresponding to the tuning DC power is set to be within the common allowable range of voltage.

2. A liquid crystal television receiver comprising:
   a DC power supply to generate and to output tuning DC power providing a predetermined voltage;
   a receiving portion to output a video signal;
   a display portion to display the video signal; and
   a lowpass filter,
   wherein
   the receiving portion is fed the tuning DC power, sets a tuning frequency of a tuning circuit at a frequency corresponding to a received channel by applying a tuning signal to a variable-capacitance diode included in the tuning circuit, and receives a video signal, the tuning signal being generated according to the tuning DC power,
   the display portion includes:
   an active-matrix liquid crystal panel;
   a gate driver to generate a gate-on signal and to drive a gate line of the active-matrix liquid display panel using the gate-on signal, which turns on a gate by using gate-on DC power as operating power; and
   a data driver to drive a data line of the active-matrix liquid crystal panel,
   an allowable range of voltage corresponding to the tuning DC power and an allowable range of voltage corresponding to the gate-on DC power share, at least partly, a common allowable range of voltage,
   the tuning DC power is fed to the gate driver as the gate-on DC power,
   the lowpass filter is provided on at least one of a first power supply path to feed the tuning DC power from the DC power supply to the gate driver and a second power supply path to feed the tuning DC power from the DC power supply to the receiving portion, and removes noise component, which is generated when the gate driver drives the gate lines, and
   a voltage corresponding to the tuning DC power is set to be within the common allowable range of voltage.

3. A liquid crystal television receiver comprising:
   a DC power supply to generate and to output tuning DC power providing a predetermined voltage;
   a receiving portion to output a video signal; and
   a display portion to display the video signal,
   wherein
   the receiving portion is fed the tuning DC power, sets a tuning frequency of a tuning circuit at a frequency corresponding to a received channel by applying a tuning signal to a variable-capacitance diode included in the tuning circuit, and receives a video signal, the tuning signal being generated according to the tuning DC power, the display portion includes:

an active-matrix liquid crystal panel;

a gate driver to generate a gate-on signal and to drive a gate line of the active-matrix liquid display panel using the gate-on signal, which turns on a gate by using gate-on DC power as operating power; and a data driver to drive a data line of the active-matrix liquid crystal panel, an allowable range of voltage corresponding to the tuning DC power and an allowable range of voltage corresponding to the gate-on DC power share, at least partly, a common allowable range of voltage, the tuning DC power is fed to the gate driver as the gate-on DC power, and a voltage corresponding to the tuning DC power is set to be within the common allowable range of voltage.

* * * * *